United States Patent
Lee

[11] Patent Number: 6,066,277
[45] Date of Patent: May 23, 2000

[54] METHOD FOR PRODUCING A BICYCLE SADDLE

[76] Inventor: Daniel Lee, No. 323, Chung-Hua Rd., Nan-Tou City, Taiwan

[21] Appl. No.: 09/282,945

[22] Filed: Apr. 1, 1999

[51] Int. Cl.[7] .................................................. B29C 44/06
[52] U.S. Cl. ..................... 264/45.5; 264/46.4; 264/46.6; 264/271.1; 264/273
[58] Field of Search .................................. 264/45.5, 46.4, 264/273, 46.6, 271.1, 415

[56] References Cited

U.S. PATENT DOCUMENTS

| | | | |
|---|---|---|---|
| 3,604,748 | 9/1971 | Lamkemeyer | 297/214 |
| 3,708,201 | 1/1973 | Lamkemeyer | 297/214 |
| 3,905,643 | 9/1975 | Lamkemeyer | 297/212 |
| 4,559,366 | 12/1985 | Hostettler | 521/51 |
| 4,608,214 | 8/1986 | Balle et al. | 264/45.5 |
| 4,636,531 | 1/1987 | Schmidt et al. | 264/45.5 |
| 4,925,513 | 5/1990 | Witzke et al. | 156/245 |
| 5,334,620 | 8/1994 | Horn et al. | 264/45.5 |

*Primary Examiner*—Allan R. Kuhns
*Attorney, Agent, or Firm*—Limbach & Limbach L.L.P.

[57] ABSTRACT

A method for producing a bicycle saddle includes the steps of:

(a) forming a rigid saddle base having therein a hole;

(b) positioning the saddle base on a projecting mold part of a male mold, wherein the projecting mold part has a surface contoured to complement a concave inner surface of the saddle base, and the surface is formed with an indentation;

(c) placing a foam material in a female mold;

(d) causing the projecting mold part to project into and close a mold cavity of the female mold; and (e) forming a saddle cushion around the saddle base by causing the foam material to expand and fill a space around the projecting mold part and then fill the indentation in the projecting mold part through the hole in the saddle base.

3 Claims, 6 Drawing Sheets

METHOD FOR PRODUCING A BICYCLE SADDLE

BACKGROUND OF THE INVENTION

1. Field of the Invention

The invention relates to a method for producing a bicycle saddle, more particularly to a method for producing a bicycle saddle that can reduce production time and that can enhance cushioning effect of the saddle.

2. Description of the Related Art

Referring to FIG. 1, a conventional bicycle saddle is shown to include a rigid saddle base 1, a foam layer 2, and a leather covering 3. The foam layer 2 is provided between the saddle base 1 and the covering 3, and is deformable so as to impart a cushioning effect to the bicycle saddle. However, since the foam layer 2 is sandwiched in between the saddle base 1 and the covering 3, the space for deformation of the foam layer 2 is limited, thereby reducing the cushioning effect of the foam layer 2.

Referring to FIG. 2, another conventional bicycle saddle is shown to include a rigid saddle base 4 having two through holes 4a, a foam layer 6, and a leather covering 7. The saddle base 4 further has two engaging grooves 4b. Each engaging groove 4b is disposed in a top surface of the saddle base 4 around the corresponding through hole 4a, and a resilient body 5 filled in each through hole 4a. Each resilient body 5 has a flanged portion 51 positioned in the corresponding engaging groove 4b. The foam layer 6 is placed on the saddle base 4, whereas the covering 7 covers the saddle base 4 and the foam layer 6. This construction provides an enhanced cushioning effect. However, the fabrication of the bicycle saddle requires two injection molding steps, thereby increasing the production time and rendering the production uneconomical.

SUMMARY OF THE INVENTION

Therefore, the main object of the present invention is to provide a method for producing a bicycle saddle which can reduce production time and which can enhance the cushioning effect of the saddle.

According to this invention, a method for producing a bicycle saddle comprises:

(a) forming a rigid saddle base having a support region with a converging part and a diverging part, a lateral flange extending around the support region, a hole formed in the diverging part, a concave inner surface defined by the support region and the lateral flange, and a convex outer surface opposite to the concave inner surface;

(b) placing the saddle base in a male mold including a projecting mold part with a surface which is contoured to substantially complement the concave inner surface of the saddle base, and an indentation formed in the surface of the projecting mold part, wherein the saddle base is positioned on the surface in such a manner that the lateral flange is entirely in contact with the surface and that a portion of the support region adjacent to the indentation is spaced from the surface;

(c) placing a foam material in a female mold which has a mold cavity;

(d) causing the projecting mold part to project into the mold cavity until the mold cavity is closed, and until the convex outer surface of the saddle base extends entirely in the mold cavity; and (e) forming a saddle cushion that covers entirely the convex outer surface of the saddle base by causing the foam material to expand and fill a space in the mold cavity around the projecting mold part and then fill the indentation through the hole in the saddle base.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
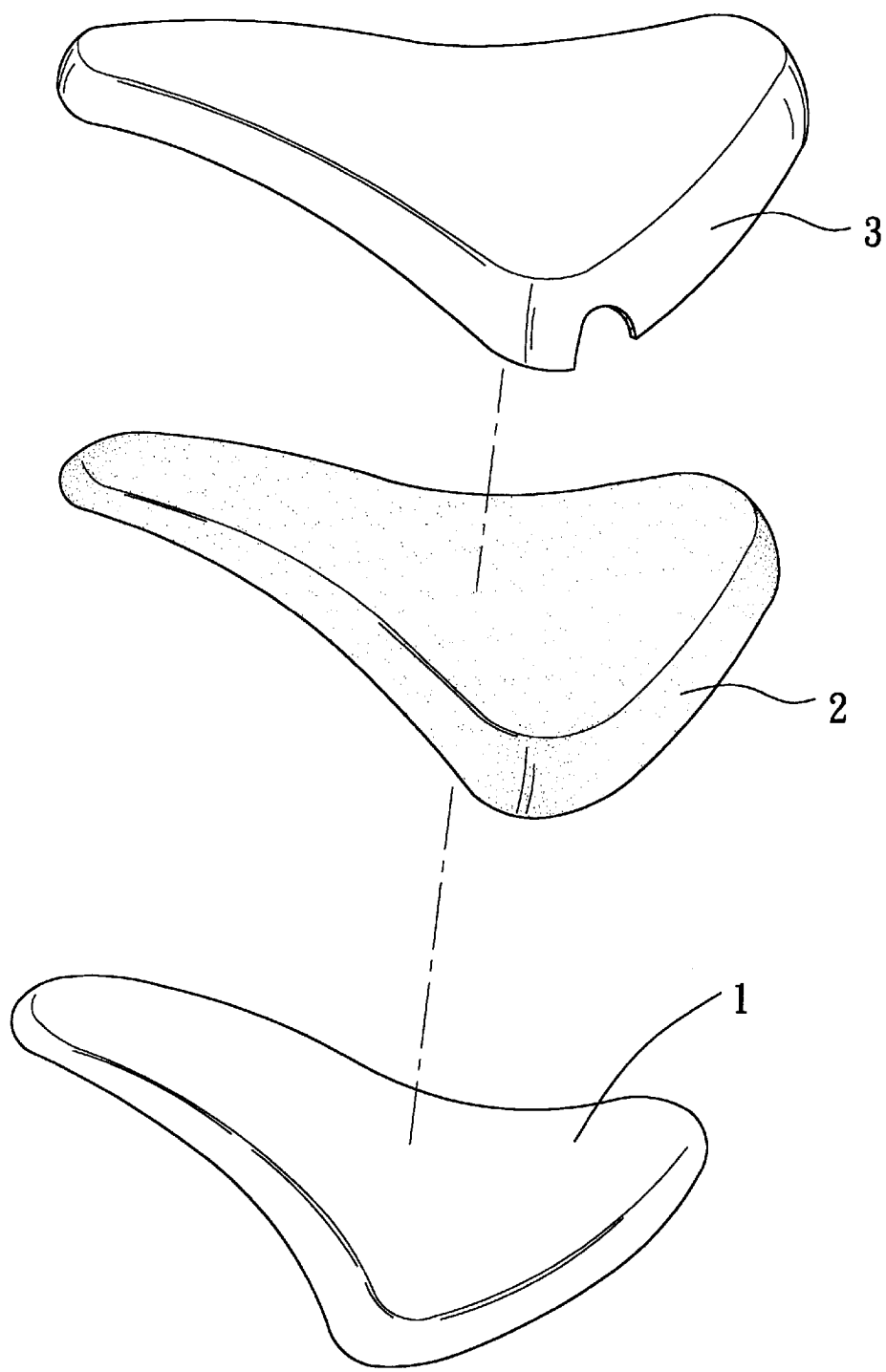
FIG. 1 is an exploded perspective view showing a conventional bicycle saddle.
Figure 2:
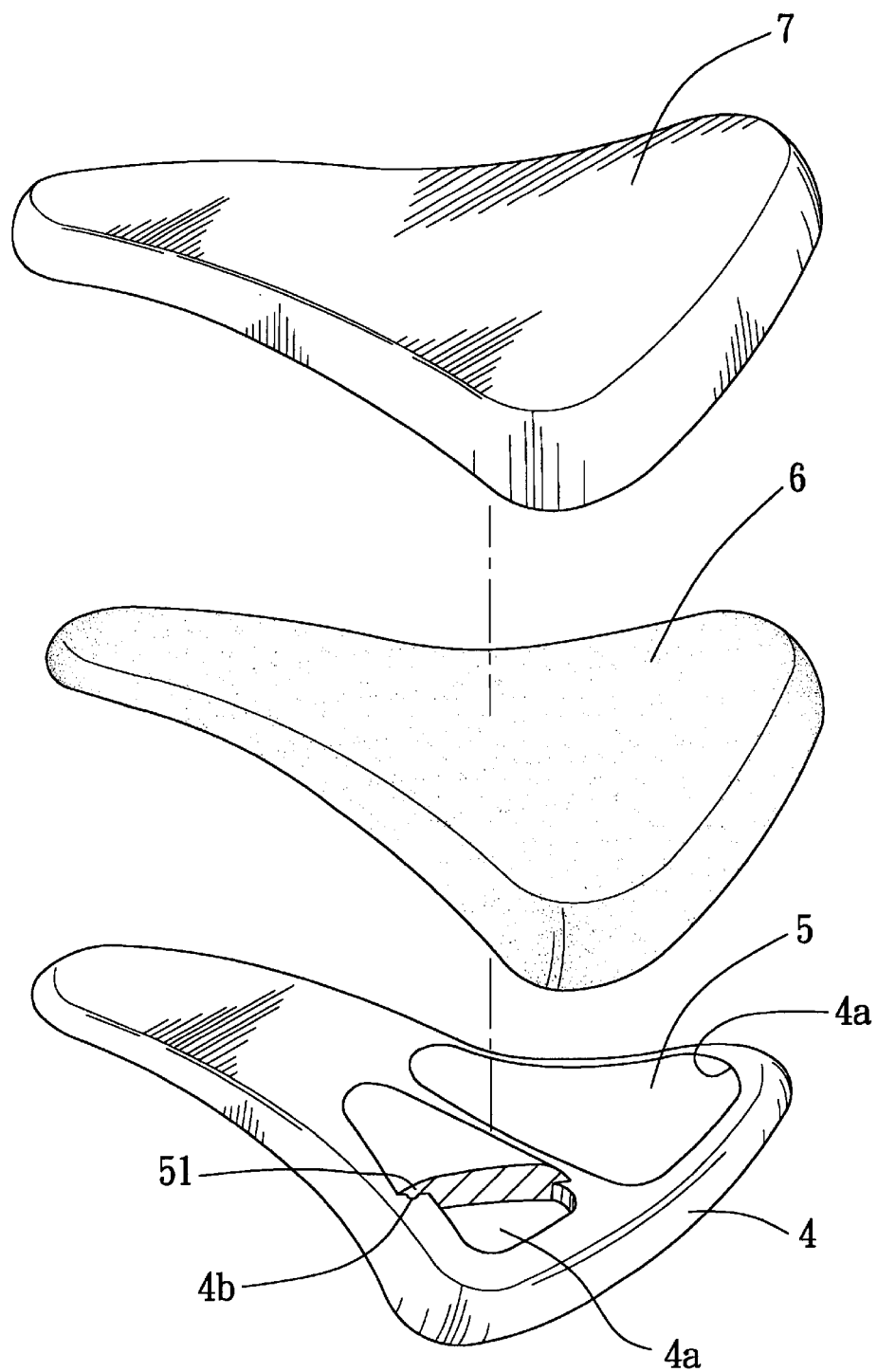
FIG. 2 is an exploded perspective view showing another conventional bicycle saddle.
Figure 3:
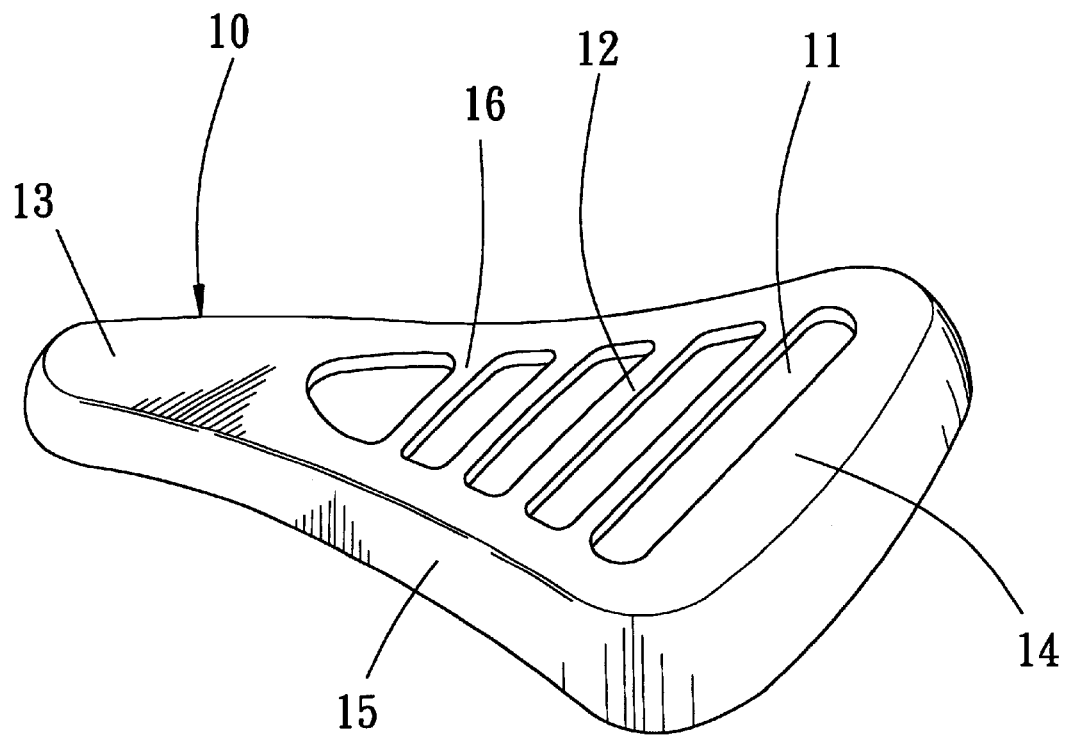
FIG. 3 is a perspective view showing a saddle base made by the preferred embodiment of a method according to this invention.

Referring to FIG. 3, in a preferred embodiment of a method for producing a bicycle saddle according to this invention, a rigid saddle base 10 is formed so as to include a support region 16 with a converging part 13 and a diverging part 14, and a lateral flange 15 extending around the support region 16. A hole 11 is formed in the diverging part 14 of the support region 16, and a plurality of ridges 12 cross the hole 11.

Figure 4:
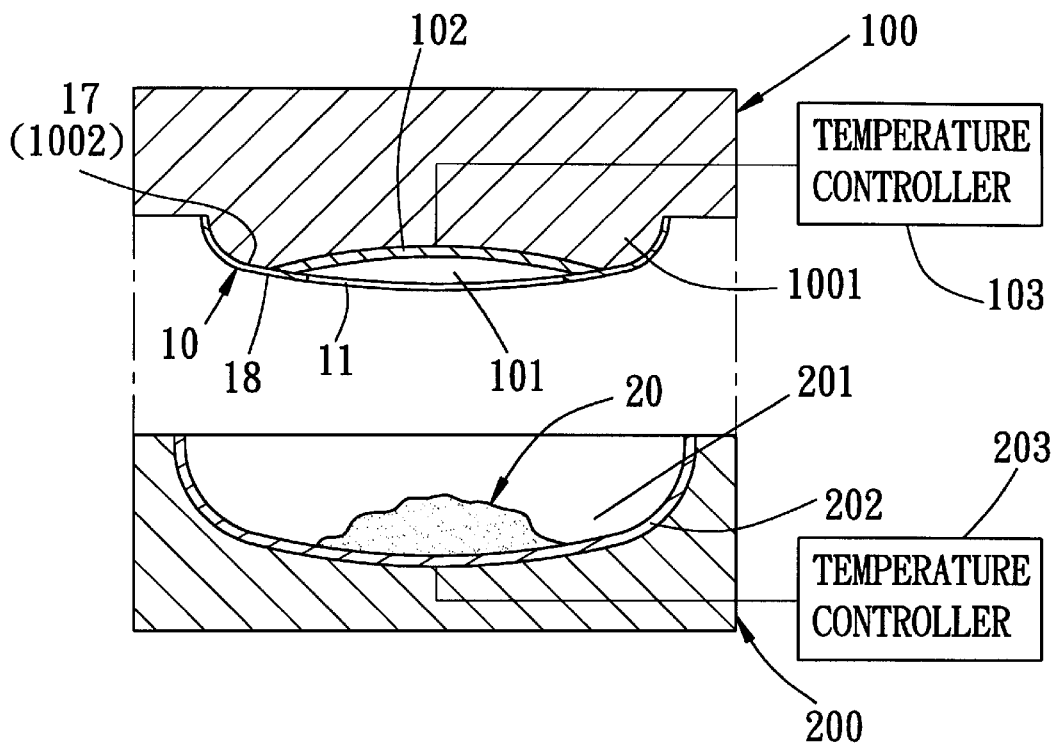
FIG. 4 is a schematic view showing a pair of molds used in the processing of this invention in an open state.
Figure 5:
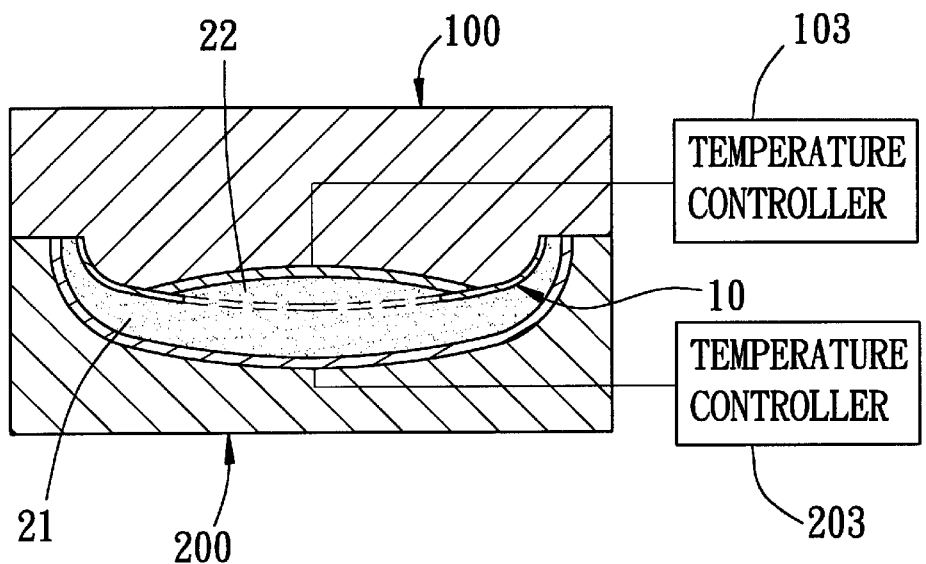
FIG. 5 is a schematic view showing the pair of molds in a closed state.

As shown in FIGS. 4 and 5, the saddle base 10 is mounted on a male mold 100 including a projecting mold part 1001 with a surface 1002 which is contoured to substantially complement a concave inner surface 17 of the saddle base 10. An indentation 101 is formed in the surface 1002. The saddle base 10 is positioned on the surface 1002 in such a manner that the lateral flange 15 entirely contacts the surface 1002 and that a portion of the support region 16 adjacent to the indentation 101 is spaced from the surface 1002.

A foam material 20 is placed in a mold cavity 201 of a female mold 200. The female mold 200 is sculptured (not shown) so as to emboss the surface of a product formed in the mold cavity 201.

When the projecting mold part 1001 is moved to close the mold cavity 201, a convex outer surface 18 of the saddle base 10 projects entirely into the mold cavity 201 and occupies a portion of the mold cavity 201.

A saddle cushion 21 is formed to cover entirely the convex outer surface 18 of the saddle base 10 by causing the foam material 200 to expand and fill a space around the projecting mold part 1001 and then fill the indentation 101 through the hole 11 in the saddle base 10. The saddle cushion 21 as formed has a portion 22 that covers in part the concave inner surface 17 of the saddle base 10.

Figure 6:
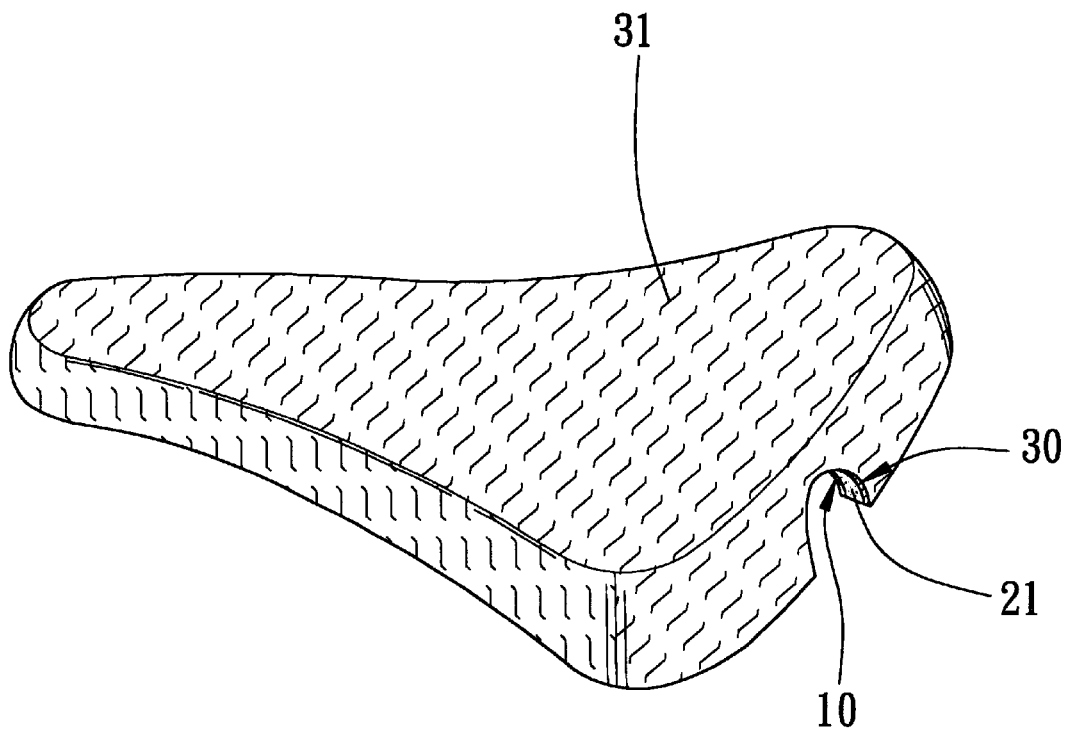
FIG. 6 is a perspective view of a bicycle saddle produced by the method according to this invention.

Two heaters 102, 202 are provided in the male and female molds 100, 200 adjacent to the surface 1002 and the mold cavity 201, respectively. The heaters 102, 202 are controlled by two temperature controllers 103, 203, respectively, so as to form on the saddle cushion 21 a skin layer 30 with a controlled thickness, as shown in FIG. 6. A pattern 31 is formed on the skin layer 30 of the saddle cushion 21 as a result of sculpturing of the female mold 200.

Figure 7:
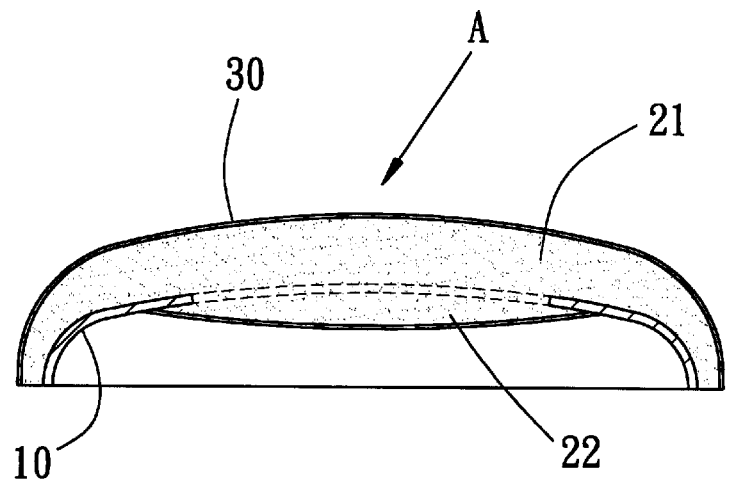
FIG. 7 is a sectional view showing the bicycle saddle of FIG. 6.
Figure 8:
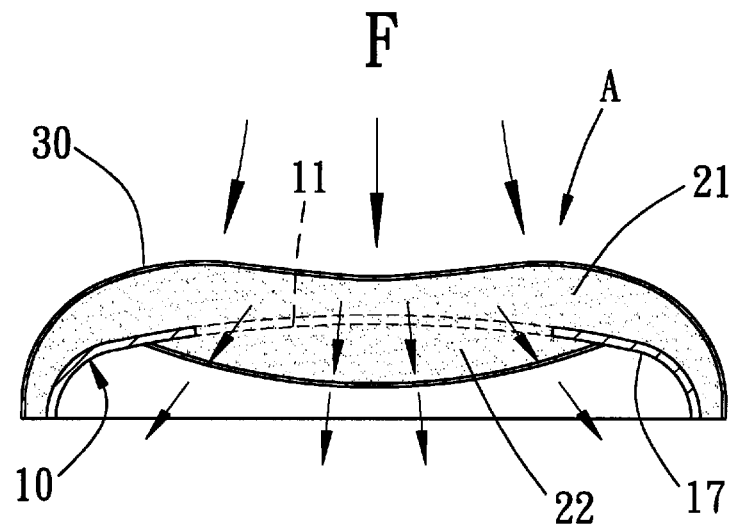
FIG. 8 is a sectional view of the bicycle saddle of FIG. 7 in a compressed state.

FIGS. 7 and 8 show a bicycle saddle (A) formed via the method of the present invention as described hereinabove.

The method for producing a bicycle saddle (A) of this invention has the following advantages:

1. The method requires only one injection molding step to form the saddle cushion 21 and the skin layer 30 integral with the saddle base 10. The method is thus simple and economical, as compared to the two-step molding taught in the prior art.

2. When the saddle cushion 21 is in use, it is compressed as shown in FIG. 8. As the saddle cushion 21 is deformable in a large extent by moving to the concave inner surface 17 of the saddle base 10 through the hole 11, the energy stored upon deformation is high, and the cushioning effect of the bicycle saddle (A) is enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for producing a bicycle saddle, comprising:
   (a) forming a rigid saddle base having a support region with a converging part and a diverging part, a lateral flange extending around the support region, a hole formed in the diverging part, a concave inner surface defined by the support region and the lateral flange, and a convex outer surface opposite to the concave inner surface;
   (b) placing the saddle base in a male mold including a projecting mold part with a surface which is contoured to substantially complement the concave inner surface of the saddle base, and an indentation formed in the surface of the projecting mold part, wherein the saddle base is positioned on the surface in such a manner that the lateral flange is entirely in contact with the surface and that a portion of the support region adjacent to the indentation is spaced from the surface;
   (c) placing a foam material in a female mold which has a mold cavity;
   (d) causing the projecting mold part to project into the mold cavity until the mold cavity is closed, and until the convex outer surface of the saddle base extends entirely in the mold cavity; and
   (e) forming a saddle cushion that covers entirely the convex outer surface of the saddle base by causing the foam material to expand and fill a space in the mold cavity around the projecting mold part and then fill the indentation through the hole in the saddle base.

2. The method as claimed in claim 1, wherein the step (e) includes providing the male and female molds with heaters adjacent to the mold cavity and the surface of the projecting mold part, and controlling the temperature of the heaters so as to form a skin layer on the saddle cushion.

3. The method as claimed in claim 1, wherein the saddle base is formed with a plurality of ridges crossing the hole.

* * * * *